United States Patent [19]

LaMarche

[11] 4,258,096
[45] Mar. 24, 1981

[54] COMPOSITE TOP MEMBRANE FOR FLAT PANEL SWITCH ARRAYS

[75] Inventor: Frederick W. LaMarche, Northfield, Minn.

[73] Assignee: Sheldahl, Inc., Northfield, Minn.

[21] Appl. No.: 959,238

[22] Filed: Nov. 9, 1978

[51] Int. Cl.$^3$ .......................... B32B 3/10; B32B 5/18; B32B 7/04
[52] U.S. Cl. ................................... 428/209; 200/5 A; 200/86 R; 200/159 B; 428/215; 428/315
[58] Field of Search ............... 428/310, 313, 315, 209, 428/213, 215, 901; 200/5 A, 86 R, 159 B

[56] References Cited

U.S. PATENT DOCUMENTS

| | | | |
|---|---|---|---|
| 3,591,749 | 7/1971 | Comstock | 200/159 B |
| 3,617,660 | 11/1971 | Krakinowski | 200/159 B |
| 3,688,066 | 8/1972 | Adelson et al. | 200/159 B |
| 3,693,775 | 9/1972 | Brooks et al. | 200/159 B |
| 3,699,294 | 10/1972 | Sudduth | 200/159 B |
| 3,760,137 | 9/1973 | Shimojo et al. | 200/159 B |
| 3,789,167 | 1/1974 | Seeger, Jr. et al. | 200/159 B |
| 3,862,381 | 1/1975 | Glaister et al. | 200/159 B |
| 3,879,586 | 4/1975 | Du Rocher et al. | 200/159 B |
| 3,920,940 | 11/1975 | Brown et al. | 200/86 R |
| 3,993,833 | 11/1976 | Esmay | 428/315 |
| 4,035,593 | 7/1977 | Riniker | 200/5 A |
| 4,065,649 | 12/1977 | Carter et al. | 200/159 B |
| 4,090,045 | 5/1978 | Marsh | 200/86 R |
| 4,125,653 | 11/1978 | Muzik | 428/310 |
| 4,137,116 | 1/1979 | Miller | 428/313 |

*Primary Examiner*—William J. Van Balen
*Attorney, Agent, or Firm*—Orrin M. Haugen; Thomas J. Nikolai

[57] ABSTRACT

A composite top membrane designed for use with membrane-type switch arrays which is substantially smooth and ripple free. The composite membrane comprises:

(1) a layer of plastic foam which is coated on each side with a pressure sensitive adhesive;
(2) a decorative cover layer formed from plastic and having graphic indicia on one or both surfaces and which is adhesively affixed to one side of the aforementioned layer of plastic foam; and
(3) a sheet of plastic having a significant memory property having its first surface adhesively affixed to the other side of the foam layer and a pattern of conductive metallization on its second surface.

The layer of foam material provides a flat, resilient interface between the decorative cover layer and the relatively convoluted surface of the flexible printed circuit top membrane. As such, the decorative layer remains flat and free from optical irregularities which would detract from its aesthetic impression.

8 Claims, 2 Drawing Figures

COMPOSITE TOP MEMBRANE FOR FLAT PANEL SWITCH ARRAYS

BACKGROUND OF THE INVENTION

I. Field of the Invention

This invention relates generally to the construction of flat panel membrane-type switch arrays of the type now finding wide usage on a variety of household and industrial appliances and more specifically to the design of an improved composite top membrane for use with such switch arrays whose decorative cover layer is substantially free from unsightly ripples.

II. Discussion of the Prior Art

As mentioned above, flat panel membrane-type switch arrays are now finding wide application in a variety of electrical and electronic devices. Typically, a membrane-type switch comprises a base plate having a pattern of printed conductors thereon and overlaying this base plate is a spacer layer having apertures therethrough which are aligned with the pattern on the base plate. Disposed on the opposite side of the spacer layer is a resilient plastic material having a pattern of metallization on the undersurface thereof, also in substantial registration with the apertures formed in the spacer layer. Graphic information such as alphanumeric characters are frequently provided on the opposite surface of the metallized plastic layer and completing the assembly may be a top protective layer of clear plastic which permits the graphic information to be viewed by the user. To operate the switch, the user applies finger pressure to the indicia, thus forcing the metallized plastic layer through the spacer so as to contact the printed circuit pattern on the base plate. Once the finger pressure is removed, the "memory" property of the metallized plastic layer allows the metallization pattern to be withdrawn from contact with the printed circuit pattern on the base plate.

It is also common practice to adhesively bond the various layers one to the other. That is, the outer clear plastic layer may be bonded to the side of the metallized layer having the alphanumeric information printed on it and the spacer layer is then bonded to the side of the plastic layer bearing the metallization. Again, adhesive may be used to bond the undersurface of the spacer layer to the base plate having the printed circuit pattern on it.

One significant problem that has detracted from wider use of membrane-type switch arrays is the presence of unsightly ripples in the decorative cover layer. It is found that when the prior art approach is employed in constructing such panels, the outer plastic layers tend to follow the convolutions of the metallization pattern and depressions surrounding the spacer apertures such that light is reflected in a non-uniform manner and instead of appearing flat, the diaphragm switch array appears rippled and non-planar.

A typical prior art top assembly for a membrane-type switch is shown in the Riniker U.S. Pat. No. 4,035,593. In this arrangement the spacer layer is identified by numeral 20, the flexible membrane having the memory property is identified by numeral 14 and has a metallization pattern 16 on the undersurface thereof in substantial registration with the apertures formed in the spacer layer and has printed indicia (not shown) on the opposite surface thereof. Completing the assembly is a clear plastic cover layer 12 which protects the graphic material from wear. Adhesive layers 22 and 24 are provided for bonding the various layers or sheets together.

It is found that when switch panels of any appreciable size are constructed in this fashion, slight irregularities in the way of ripples, undulations and irregular depressions occur. Where the outer transparent protective layer has a glossy finish, these irregularities are highly noticable in that the light pattern reflected from the glossy surface highlights the fact that the surface is not perfectly smooth. It is, of course, desirable that the outward appearance of the glossy panel surface appear as if it were a sheet of smooth glass with no noticable irregularities.

SUMMARY OF THE INVENTION

The present invention obviates, to a great extent, the aesthetic problems associated with prior art membrane-type switch panels. That is, panels constructed in accordance with the teachings of this specification yield a very smooth decorative cover layer without noticably increasing the actuation force required to operate the switches. This highly desirable result is achieved through the use of a intermediate layer of plastic foam material of a predetermined thickness and density, the layer being disposed between the outer decorative plastic cover layer or face plate and the flexible printed circuit which has the metallization on the undersurface thereof and which possesses the desired memory property for ensuring that the switch contacts will be broken once the actuation force is removed. The layer of plastic foam is coated on each side with a pressure sensitive adhesive such that the decorative cover plate having the graphics thereon will adhere to one side thereof and the flexible printed circuit film having the metallization on the underside will adhere to the opposite side of the plastic foam layer.

Because of the presence of the foam layer, the decorative face plate film or layer does not follow the contours of the convoluted surface of the flexible printed circuit top membrane and hence provides a relatively flat substrate for the decorative face plate film.

The Glaister et al U.S. Pat. No. 3,862,381 discloses a membrane-type switch embodying an elastomeric layer 15a beneath a decorative Mylar sheet 14 and a spacer member 16. The undersurface of the elastomeric layer is coated with a flexible non-elastomeric electrically conductive plastic. The entire assembly is held together by means of a rigid plastic frame 10. This construction differs substantially from that of the present invention in that the decorative outer film is not adhesively bonded to the elastomeric layer and the purpose of the elastomeric layer is to provide the "memory" property for ensuring that the conductive coating on the underside thereof will be withdrawn through the spacer when actuating force is removed. Thus, even though the Glaister et al Patent includes a resilient material, it is for an altogether different purpose and the overall construction is markedly distinct from the composite top membrane of the present invention.

OBJECTS

It is accordingly the principal object of the present invention to provide an improved composite top membrane for use in membrane-type switch panels wherein the visual impression upon the eye is that of a relatively smooth, ripple-free surface.

Another object of the invention is to provide a composite top membrane for use with membrane-type switch arrays which incorporates an intermediate layer of foam plastic material for averaging out the convolutions present in the membrane layer due to the pattern of conductors printed thereon such that the decorative outer cover layer has a generally smooth, flat impression upon the eye of the observer.

These and other objects and advantages of the invention will become apparent from the following detailed description of the preferred embodiment when considered in conjunction with the accompanying drawings.

DETAILED DESCRIPTION OF THE PREFERRED EMBODIMENT

Figure 1:
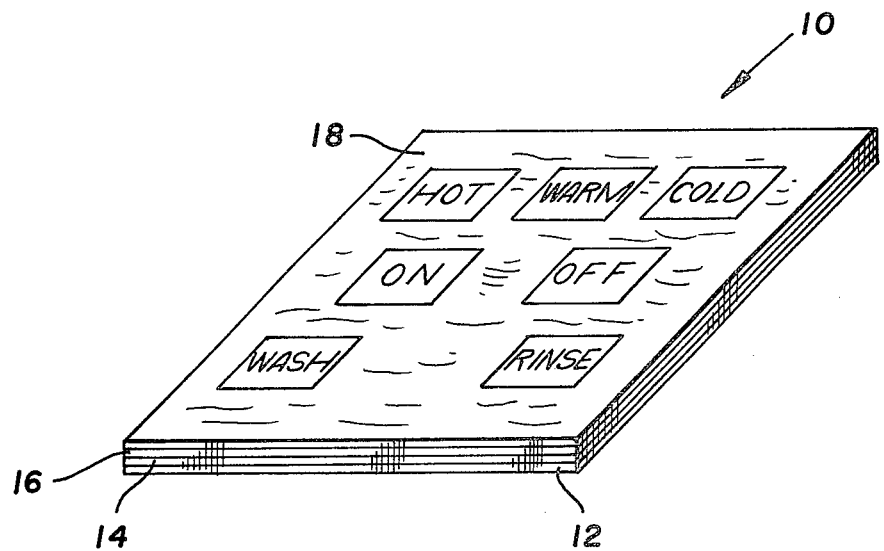
FIG. 1 is a perspective view of a typical prior art membrane-type switch assembly.
Figure 2:
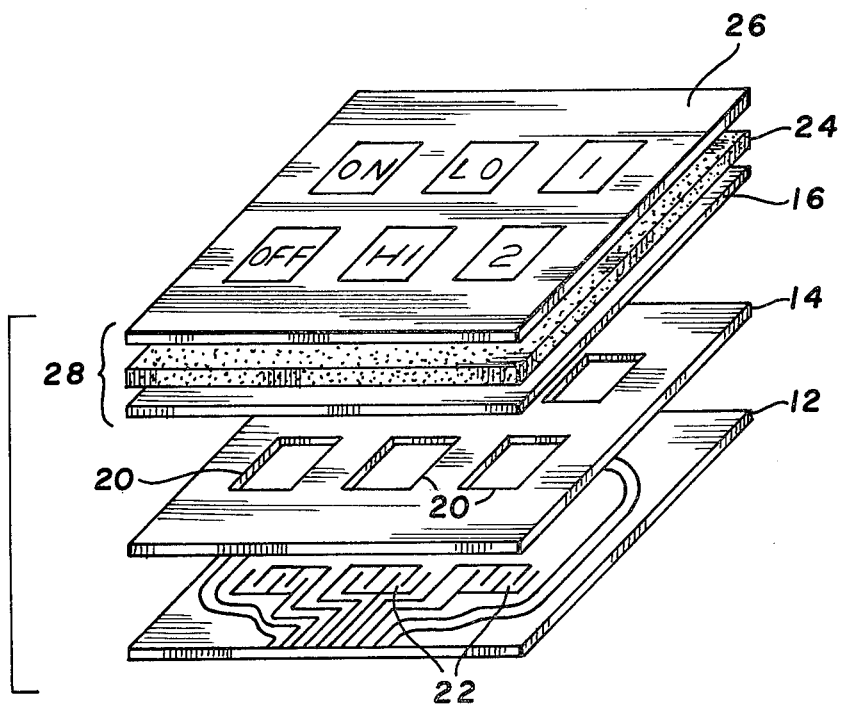
FIG. 2 is an exploded view of the preferred embodiment of the present invention.

Referring first to FIG. 1, a typical prior art construction will be described in order to provide a background for a more complete understanding of the construction and mode of operation of the present invention as depicted by FIG. 2.

With reference, then, to FIG. 1, there is shown a laminated construction of a typical membrane-type switch array, the array being indicated generally by numeral 10. The bottom-most layer identified by numeral 12 may comprise a sheet of polyester material such as Mylar, the upper surface of which is provided with a pattern of printed circuit conductors (not shown). Overlaying the sheet 12 is a spacer layer 14 which is provided with a plurality of apertures (not shown) which are in alignment with predetermined portions of the conductive pattern disposed on the upper surface of the flexible printed circuit layer 12. Laying on top of the spacer layer is a sheet of flexible plastic material 16 having a significant memory property such that when the sheet is deformed by an applied force, it will return to its original state when the force is removed. A pattern of metallization is provided on the undersurface of the sheet 16, again in substantial registration with the apertures formed through the thickness dimension of the spacer layer. It is common practice to also provide printed graphic material on the upper surface of the sheet 16 to identify the location where pressure is to be applied in operating one of the switch positions along with alphanumeric information indicative of the function to be performed by that particular switch in the application to which the switch array 10 is utilized. Overlaying the flexible membrane 16 is a transparent or translucent cover sheet 18 which, too, may be fabricated from a suitable flexible plastic material such as polyester or polycarbonate. The purpose of the cover sheet 18 is to protect the printed graphics from wear when finger pressure is applied in order to deform the metallized sheet 16 through the apertures in the spacer 14 so as to abut the printed circuit pattern on the flexible circuit layer 12. Typically, the layers 12, 14, 16 and 18 are bonded one to the other by a suitable pressure sensitive adhesive. These adhesive layers are not illustrated in the FIG. 1 arrangement. The membrane-type switch array 10, when fabricated as indicated above, is found to exhibit irregularities in the way of ripples and depressions in the cover layer 18. This is due to the fact that the layer 16 containing the printed circuit pattern of metallization tends to be somewhat convoluted and because the cover layer 18 is bonded directly thereto, it too develops non-planar contours.

It is, of course, desirable that the membrane-type switch array appear smooth and ripple-free. Where a clear, glossy cover member 18 is provided, any ripples or depressions tend to be highlighted by the reflected ambient light striking the panel.

The present invention is intended to significantly reduce and even eliminate these unsightly surface irregularities on the decorative cover plate of membrane-type switch arrays. The manner in which this is achieved is best illustrated in the exploded view of FIG. 2. In this view there is illustrated the flexible printed circuit layer 12, the spacer layer 14, the flexible printed circuit layer 16, all of which may be identical to the corresponding structures having identical identifying numerals shown in FIG. 1. Again, the underside of the flexible layer 16 is provided with a metallization pattern (not shown) which is adapted to be forced through the apertures 20 formed in the spacer layer 14 in order to effect electrical contact with the printed circuit pattern 22 disposed on the upper surface of the flexible circuit 12. While in FIG. 2 these layers 12, 14 and 16 are shown in an exploded relationship, it is to be understood that they are adhesively bonded one to the other to form a laminated assembly.

In order to achieve the desired result of a smooth, ripple-free decorative outer layer, an intermediate layer of plastic foam material 24 which is coated on each side thereof with pressure sensitive adhesive is inserted between the flexible printed circuit layer 16 and the outer decorative cover layer 26. The cover layer 26 is fabricated from a clear or translucent plastic and is provided with graphics on the underside thereof which are therefore visible to the user. Because the graphic indicia are printed on the undersurface of the outer protective sheet 26, this printed information is not subject to wear and deterioration through continued use of the apparatus.

The face plate 26 is preferably made from polyester or polycarbonate material and, as indicated, may be clear or translucent. The thickness of this sheet is preferably 0.007 inches but limitation to this thickness is not intended. In fact, it is found that a face plate member 26 having a thickness in the range from 0.005 inches to 0.012 inches is entirely workable. While some manufacturers will prefer a gloss finish on the outer surface of the decorative plastic face plate 26, it is also possible to provide an embossed or matte finish thereon.

The double adhesive coated foam layer 24 performs two functions. First, it provides a surface on which the decorative layer 26 and the top membrane of the switch 16 can be bonded together. Its primary function, however, is to provide a resilient interface between the relatively convoluted surface of the flexible printed circuit top membrane 16 and the desired smooth surface decorative cover layer 26. The foam layer may range in thickness from 0.030 inches to 0.125 inches, thicker materials being used to level out more convoluted circuit patterns on the top switch membrane 16. The density of the foam should be relatively high and it has been found that densities in the range of from 5 to 20 durometer are highly suitable. The foam material, itself, can be any of the commonly available types, i.e., polyethylene, polyurethane or polypropylene, all of which produce highly suitable results. An example of a material that has been found to work well under most circumstances is Adhesive Research Brand, Type PE-2116 double adhesive coated foam.

The flexible printed circuit layer 16 is typically the top layer of a prior art membrane switch. It may comprise a polyester film having a thickness in the range of 0.003 inches to 0.005 inches. However, in some applications where high ambient operating temperatures are encountered, the preferred material may be a polyimide film or a polyparabanic acid film, such as that sold by the Exxon Corporation under the trademark "Tradlon", of the same thickness as suggested above for the polyester film. It is the "memory" of these films that assure that the top membrane of the switch 16 will return to the off contact position when actuation pressure is removed from the switch. The bottom side of the membrane 16 contains the metallization that carries the electrical current. This metallization may be of the silver epoxy type or the tin plated copper type.

Thus, the composite top membrane of the present invention is identified by the bracketed layers 28 which include the flexible circuit layer 16, the plastic foam layer 24 and the decorative face plate 26 having the graphic information on the undersurface thereof. The remainder of the membrane type switch array shown in FIG. 2, i.e., the spacer layer 14 and the flexible printed circuit layer 12 may be separately bonded to a rigid back panel (not shown) and fabricated separately from the composite top membrane. During final assembly, the membrane switch array is completed by suitably bonding the upper surface of the spacer layer 14 to the underside of the flexible printed circuit layer 16 with arrangements being made to ensure that the switch positions identified by the graphics on the decorative face plate are in proper registry with the apertures in the spacer member.

Products fabricated in accordance with the foregoing description are found to exhibit a more pleasing appearance than has otherwise been attainable using prior art techniques. The inclusion of the foam plastic layer substantially precludes the occurrence of ripples and unsightly reflections from the decorative face plate and by the proper choice of materials and dimensions it is found that the inclusion of the foam plastic layer does not appreciably affect the amount of applied force needed to effect a circuit closure.

Numerous variations and modifications of this invention are possible in light of the above teachings. Accordingly, the scope of the invention is not to be limited by the foregoing description but is to be taken solely by an interpretation of the claims which follow.

What is claimed is:

1. A composite top membrane for use in flat panel membrane-type switch arrays, comprising:
    (a) a first sheet of flexible plastic material having a substantial restorative property such that when an applied force is removed therefrom, said sheet will return to its unstressed condition, said sheet having a pattern of metallization on the undersurface thereof;
    (b) a continuous layer of plastic foam material of a predetermined generally constant thickness and density having a pressure sensitive adhesive coated on both sides thereof; and
    (c) a deformable, decorative plastic face plate sheet having graphic material on at least one surface thereof, said face plate being adhesively affixed to a first surface of said layer of plastic foam material and said first sheet being adhesively affixed to the second surface of said layer of plastic foam material with said undersurface exposed.

2. The composite top membrane as in claim 1 wherein said layer of plastic foam is of a thickness in the range of from 0.030 inches to 0.125 inches.

3. The composite top membrane as in claim 1 wherein said predetermined density is in the range of from 5 to 20 durometer.

4. The composite top membrane as in claim 1 wherein said first sheet of flexible plastic material comprises a film formed from polyester, polyimide, or polyparabanic acid material having a thickness in the range of from 0.003 inches to 0.0075 inches.

5. The composite top membrane as in claim 2 wherein said plastic foam is formed from polyethylene, polyurethane or polypropylene.

6. The composite top membrane as in claim 1 wherein said deformable decorative plastic face plate sheet is a sheet of polyester or polycarbonate having a thickness in the range of from 0.005 inches to 0.012 inches.

7. The composite top membrane as in claim 6 wherein the side of said decorative plastic face plate sheet adhesively affixed to said second side of said layer of plastic foam is printed with graphic indicia.

8. A composite top membrane for use in flat panel membrane-type switch arrays comprising:
    (a) a first sheet of clear polyester material having a thickness of 0.007 inches and having graphic indicia on one side surface thereof;
    (b) a double adhesive coated continuous layer of polyurethane foam material having a generally constant thickness in the range of from 0.030 inches to 0.125 inches and a density in the range of from 5 to 20 durometer, said one side of said sheet of clear polyester abutting and adhesively secured to one side of said layer of polyurethane foam; and
    (c) a second sheet of polyester film material having a thickness in the range of from 0.003 inches to 0.005 inches with one side thereof abutting and adhesively secured to the other side of said layer of foam and the other side of said sheet of polyester film having a pattern of electrical conductors thereon, the arrangement being such that said composite top membrane is substantially free of convolutions.

* * * * *